H. D. MARCUS.
COMBINATION TEA AND COFFEE PERCOLATOR.
APPLICATION FILED MAY 20, 1918.

1,294,505.

Patented Feb. 18, 1919.

Inventor
H. D. Marcus
By John F. Kerr
Attorney

UNITED STATES PATENT OFFICE.

HENRY D. MARCUS, OF PASSAIC, NEW JERSEY.

COMBINATION TEA AND COFFEE PERCOLATOR.

1,294,505. Specification of Letters Patent. Patented Feb. 18, 1919.

Application filed May 20, 1918. Serial No. 235,715.

*To all whom it may concern:*

Be it known that I, HENRY D. MARCUS, a citizen of the United States, residing at Passaic, in the county of Passaic and State of New Jersey, have invented certain new and useful Improvements in Combination Tea and Coffee Percolators, of which the following is a specification.

My invention relates to improvements in percolators adapted to be alternately used in making tea, coffee or the like.

An important object of the invention is to provide a percolator of the above mentioned character, which is non-sinkable and adapted to be arranged in an ordinary tea or coffee pot.

A further object of the invention is to provide a device of the above mentioned character, which is simple in construction, inexpensive to manufacture, and convenient in use.

Other objects and advantages of the invention will be apparent during the course of the following description.

Figure 1:
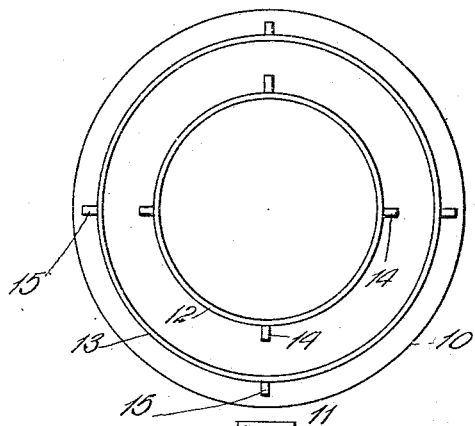
Figure 2:
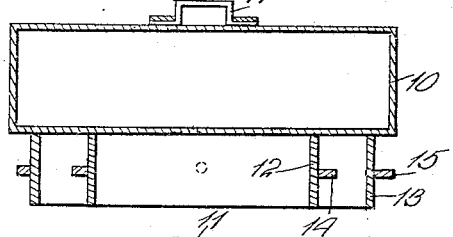
Figure 3:
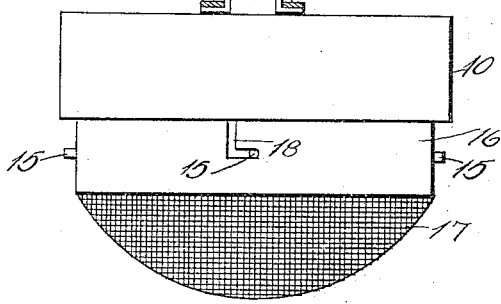
Figure 4:
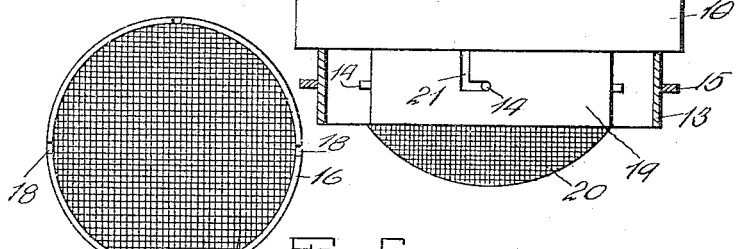
Figure 5:

In the accompanying drawings forming a part of this specification and in which like numerals are employed to designate like parts throughout the same, Figure 1 is a bottom plan view of the body portion of the percolator, Fig. 2 is a transverse sectional view through the same, Fig. 3 is a side view of the percolator showing the coffee attachment, Fig. 4 is a side elevation, parts in section, showing the tea attachment, and Fig. 5 is a plan view of the coffee attachment.

In the drawings, wherein for the purpose of illustration is shown a preferred embodiment of my invention, the numeral 10 designates a float, constituting the body portion of the percolator. This float is shown hollow and may be formed of sheet metal or the like. A handle 11 is secured to the top of the float 10. Depending from the lower end or side of the float 10 are inner and outer annular flanges 12 and 13. The flange 12 carries a plurality of radially extending pins 14, and the flange 13 carries a plurality of radially extending pins 15, as shown.

The coffee strainer attachment embodies a ring 16 to which is secured a strainer attachment 17, made of cloth or the like. The ring 16 is provided with L-shaped openings 18 for receiving the pins 15, as shown.

The tea strainer attachment comprises a ring 19, carrying a sack or strainer 20. The ring 19 has L-shaped slots or openings 21 for the reception of the pins 14.

The operation of the device is as follows:

The sack or strainer 17 is suitably filled with coffee and the ring 16 inserted upon the flange 13, the pins 15 passing into the L-shaped slots 18. The device is then placed in a coffee pot or other receptacle containing boiling water and will float thereon.

When it is desired to use the same in making tea, the coffee strainer attachment is removed from the flange 13 and the ring 19 of the tea strainer attachment secured to the flange 12.

It is to be understood that the forms of my invention herewith shown and described are to be taken as preferred examples of the same, and that various changes in the shape, size, and arrangement of parts may be resorted to without departing from the spirit of my invention or the scope of the subjoined claim.

Having thus described my invention, I claim:

A percolator of the character described, comprising a float, a plurality of annular depending flanges secured to the float in spaced concentric relation, a corresponding number of strainer attachments embodying rings, and means for detachably securing the rings with the corresponding flanges.

In testimony whereof I affix my signature.

HENRY D. MARCUS.